United States Patent Office 3,132,104
Patented May 5, 1964

3,132,104
PLUG VALVE LUBRICANT AND SEALANT COMPOSITIONS
George F. Scherer, Oakland, Calif., assignor to Rockwell Manufacturing Company, Pittsburgh, Pa., a corporation of Pennsylvania
No Drawing. Filed Apr. 7, 1959, Ser. No. 804,566
16 Claims. (Cl. 252—50)

This invention relates to improvements in lubricants and sealants for use in lubricated valves and more especially for services in which the valves are called upon to operate at relatively high temperatures, particularly in the range of 500° F.–1000° F., although these lubricants and sealants are not necessarily so limited and are serviceable at lower or higher temperatures. This application is a continuation-in-part of copending application Serial No. 630,731, filed December 27, 1956, now abandoned.

In service at elevated temperatures for which a lubricated type of valve, such as a lubricated plug valve, is used, the thermal stability of the lubricant is of primary importance, since the efficient functioning of the valve depends to a major degree upon the proper functioning of the lubricant to maintain a plastic seal to prevent leakage when the valve is shut off, as well as the ability of the lubricant to insure satisfactory operation of the valve.

As a practical matter, it is also necessary that the lubricant be provided in a flowable plastic condition (like a grease) so that it can be introduced into the valve and made to flow through the valve ducts and grooves which are provided for the purpose of distributing the lubricant most effectively to the valve seating surfaces, where the lubricant functions as a plastic seal as well as a lubricant for effecting smooth frictionless operation of the valve. Toward this end the valve lubricant must be a plastic of sufficiently low viscosity so that it can be injected into the valve when the valve is subjected to ordinary ambient pressures or room temperatures, i.e., when the operations in the process plant are initiated, or after shutdowns for one reason or another, in which case there is no hot line fluid flowing through the valve. This is a practical limitation required of all valve lubricants.

On the other hand, the lubricant must retain, at least to a practical extent, suitable characteristics of plasticity and viscosity at the service temperatures to which the valve is subjected to insure proper sealing of the valve against leakage. For this reason, not only must the viscosity of the lubricant not be too low, but the lubricant must be so constituted that its viscosity does not appreciably change as its various constituents are dissipated through prolonged service of the lubricant.

Furthermore, the lubricant should possess satisfactory stability in the presence of the line fluid to resist dissolution and/or chemical attack by the line fluid.

These aforementioned characteristics are not always attained completely in practice because of the limitations of the materials from which the valve lubricants have been made and because it is frequently necessary to compromise the attainable characteristics of a lubricant offered for a particular valve service so that the greatest over-all practical efficiency is obtained.

One of the most serious limitations to the use of conventional valve lubricants is that of temperature, usually arising from handling hot line fluid. The effect of temperature on plastic valve lubricants is, primarily, twofold:

(1) Most known plastic valve lubricants lose viscosity rapidly with an increase in the temperature to which they are subjected. Various devices are used to flatten the temperature-viscosity curve of valve lubricants, or, in other words, to increase the viscosity index, but in most lubricants this is only partially attained. As a result, the sealing function of the lubricants is seriously impaired and leakage is likely to occur.

(2) In the higher range of valve service temperatures to which the valve lubricant may be subjected, the effect of temperature is even more pronounced in regard to the thermal breakdown or disintegration of the lubricant. If the ingredients used in compounding the lubricant have high rates of evaporation at the temperatures to which they are subjected, even if modified by the effect of line pressure, these constituent ingredients will be dissipated, resulting in important and degrading changes in the over-all characteristics of the lubricant.

Other constituents may be thermally disintegrated by the temperature to which they are subjected. For example, when using vegetable or mineral oils as an ingredient of a valve lubricant and when such lubricant is exposed to sufficiently high temperatures, the oil breaks down, first by the evaporation of its light constituents, and then, at sufficiently high temperatures, a molecular breakdown is effected in the same manner that heavy hydrocarbon oils are cracked in the refinery process for producing lighter hydrocarbons. When such cracking occurs, the excess carbon which is not used in forming the lighter hydrocarbons is deposited in situ in the form of solid hard carbon or coke. A similar molecular breakdown occurs with other conventional organic constituents used in lubricants, such as waxes and soaps, leaving undesirable deposits. When such lubricants are used in high temperature service in the usual lubricated plug valves of the type described in the patent to Scherer, 2,584,161, issued February 5, 1952, which have lubricant supplying surface grooves at the valve seating surfaces and ducts leading to those grooves, the breakdown and deposit of carbon results in an accumulation of solid carbonaceous and other undesirable deposits in the lubricant ducts and grooves of the valves, which restricts and ultimately blocks off those ducts and grooves and prevents fresh additions of lubricant for further lubrication of the valve.

Where some of the lubricant constituents vaporize or boil off from the compounded lubricant, the solid residue will also deposit and accumulate in the lubricant ducts and grooves, resulting in the same blocking off of these lubricant ducts and grooves and preventing further lubrication of the valve. As a result, it becomes necessary to take the valve apart and scrape out the ducts and grooves before it can resume service. Such maintenance is costly.

Accordingly, it is a primary object of the instant invention to provide a novel high temperature service lubricant and sealant composition suitable for use in plug valves which is not highly volatile and does not disintegrate at its service temperatures.

Further objects of this invention are to provide a novel high temperature service lubricant and sealant composition suitable for use in plug valves which:

(1) Remains thermally stable at its service temperatures for long periods of time so that the efficiency of the lubricant in sealing the plug valve against leakage and contributing to easy operation may be maintained indefinitely;

(2) Does not break down in such a manner as to leave undesirable solid residues which result in high maintenance costs and temporary losses of service of the plug valves;

(3) Retains desirable plasticity and viscosity characteristics to insure proper sealing of the valve against leakage during continued operation of the valve and yet which is sufficiently flowable to permit its introduction into the valve and through the valve ducts and grooves at ambient pressures and temperatures; and (4) Possesses satisfactory stability in the presence of the line fluid to resist dissolution and/or chemical attack by the line fluid.

A further object of this invention is to provide a novel high temperature service lubricant and sealant composition suitable for use in plug valves comprising polybutylene or polyisobutylene, compatible polymeric alkene compounds and a sufficient amount of a suitable plasticizer to provide the desired viscosity, the proportions and choice of ingredients being such that when the lubricant is subjected to temperatures in the range of 500° F. to 1000° F. and higher, the ingredients depolymerize and evaporate slowly at relative rates such that approximately the same relative proportions of ingredients will remain in the composition substantially throughout its life, thereby avoiding the deposition of undesirable carbonaceous or other solid residue and the undepolymerized constitutents retaining their lubricating and sealing properties.

Other objects of the invention will, in part, be obvious, and will, in part, appear hereinafter.

For a fuller understanding of the nature and objects of the invention, reference should be had to the following detailed description.

It has been found that the foregoing objects may be accomplished and that suitable valve lubricants and sealants for high temperature service (i.e., in the range of 500° F.–1000° F.) can be obtained by formulating a composition comprising as its essential ingredients (1) a low molecular weight polybutylene or polyisobutylene to serve as the oil base, (2) a polymeric alkene compound other than said low molecular weight polybutylene or polyisobutylene which is compatible therewith, which is capable of imparting reasonable viscosity characteristics to the composition at temperatures above 500° F. and which is capable of depolymerizing and evaporating at service temperatures without leaving any carbonaceous or other objectionable solid residue, and (3) a compatible plasticizer.

The principal ingredient of the instant lubricant compositions may be chosen from a reasonable range of polymeric butenes, a limiting consideration being, however, the fact that the polybutylene or polyisobutylene used as the oil base must be liquid or have the properties of a liquid when mixed with the other ingredients. Useful polybutylenes and polyisobutylenes have approximate average molecular weights of 200–1,500. Preferred polymers within this range, each having an average molecular weight of 940, are exemplified by the polyisobutylenes sold on the market by the Oronite Chemical Company and Indoil Chemical Company as "Polybutene 32" and "Indopol H–300," respectively. Polymeric butenes having molecular weights significantly higher than 1,500 are not practical as they would be too viscous to serve as oil bases.

While any polymeric alkene compounds compatible with the low molecular weight polymeric butene and having the above-recited function may be employed, preferred compounds are polyethylene, polypropylene and higher molecular weight polymeric butenes. Usable polyethylenes include (1) the high pressure, low density polyethylenes having molecular weights of 1,000–40,000 and (2) the low pressure high density (linear) polyethylenes having molecular weights of 40,000–50,000. Examples of the latter are Hercules' "Hi-fax," Koppers' "Super-Dylan" and Phillips' "Marlex."

Illustrative of the preferred polyethylenes are the products sold by Du Pont and the Bakelite Company (a division of Union Carbide and Carbon Corporation) under the "Alathon A" and "DYNH Polyethylene" designations, respectively. Each of these polymers has an average molecular weight of 21,000.

Polypropylenes which are usable as the compatible polymeric alkene compound include those having molecular weights from 200,000 to 500,000. Examples of such polymers are Hercules' "Pro-fax" and the Montecattini "Polypropylene."

As indicated above, high molecular weight polymeric butenes may also be used as the compatible polymeric alkene compound, in lieu of or in admixture with the polyethylenes and polypropylenes. Polymeric butenes usable in this capacity include both the viscous liquid and solid varieties, though the latter are generally preferred.

Of the former variety, polybutylenes and polyisobutylenes having approximate average molecular weights of 7,500 to 15,000 are preferred. Examples of these polymers are those sold by the Enjay Company and which are known as the "LM" series of "Vistanex."

Solid polymeric butenes which may be employed are those having approximate average molecular weights from 40,000 to 500,000, though the higher the molecular weight of the polymer, the more difficult it is to incorporate it into a satisfactory lubricant. At least a portion of such polymers (those ranging from molecular weights of 40,000 to 160,000) are available from the Enjay Company and are known as the "MM" series of "Vistanex."

If desired, mixtures of such polymers may be employed.

As heretofore stated, the compatible polymeric alkene compounds must be capable of evaporating at service temperatures without leaving any carbonaceous or other objectionable solid residue. This characteristic is as well required of the polybutylene or polyisobutylene and of the plasticizer. This may be achieved by using for the former two ingredients only polymers whose molecular chains are slowly broken by time and temperatures and are ultimately reduced to their initial monomers, which are fixed gases or vapors. Thus, the polyethylene depolymerizes into ethylene gas which, of course, is released due to high vapor pressure and leaves no solid deposit in the lubricant ducts or grooves. The polybutylene depolymerizes into its monomer, butylene, which is a volatile liquid or gas depending on the temperature present.

But certain polymeric materials cannot be used for the purposes of the invention since many of them break down leaving residues which are not volatile liquids or gases. For example, the high molecular weight silicone greases are very useful in temperature ranges below 500° F., but they cannot be used in valves according to the invention as they break down at temperatures of approximately 500° F. leaving a residue of silica, which would result of course in a solid deposit of silica in the valve lubricant ducts and grooves. Also not available are the high molecular weight polymers of the type resulting from the polymerization of butadiene, styrene, vinyl chloride and others which, when broken down by high temperatures, leave residues which are solid, corrosive or otherwise undesirable.

Suitable plasticizing agents are necessary in practicing my invention for the purpose of plasticizing or reducing the consistency of the polymer material and providing a soft plastic mass which can be injected into a valve lubricating system as a valve lubricant and sealant. For example, diphenyl, diphenyl ether, triphenyl, diphenylamine, and mixed terphenyls are available plasticizers. These plasticizers have sufficiently high vapor pressures to volatilize off without leaving solid residue. They are lacking in sufficient viscosity at a temperature above their melting points to be of any use as lubricants in themselves. However, when these are blended with the polyethylene (polypropylene, etc.) and polybutylene (polyisobutylene) materials in small quantities, a satisfactory high temperature resistant valve lubricant results. The plasticizer starts to volatilize at the same time as the polymeric materials begin to depolymerize.

An example of a suitable plasticizer is "Santowax-R," sold by Monsanto Chemical Company. This product is a mixture of isomeric terphenyls forming a yellow waxy solid. It has a specific gravity of 1.10, begins to soften at 56° C. and is completely liquid at 140° C.

The relative proportions of ingredients should be so chosen that the ingredients will depolymerize and/or evaporate at relative rates such that approximately the same relative proportions of ingredients will remain in the composition substantially throughout its life. In this manner, the viscosity and other characteristics of the remaining lubricant material will be substantially preserved until it is exhausted. To effect this result, however, it is necessary to correlate the polymeric materials to the plasticizer according to the desired service. For example, the polymeric materials, which are available in different grades of hardness according to their molecular weight (which is determined by the extent of polymerization), are selected for the purpose at hand, and then the plasticizer is selected which will best coact with them for desired viscosity and provide the balanced, properly proportioned compound according to the invention.

The quantity of the polymeric alkene compound which is added to the polymeric butene compound should, of course, be adequate to impart the desired viscosity and sealant characteristics to the lubricant composition. The quantity of plasticizer used will, as well, affect the viscosity characteristics of the composition.

In general, the following proportions of material, in parts by weight, have proven to be most satisfactory:

| | |
|---|---|
| Polybutylene or polyisobutylene | 40–60 |
| Compatible polymeric alkene | 23–43 |
| Plasticizer | 6–27 |

The viscosity of the lubricant and sealant of the above formulation is such that it would be difficult or impossible to use in hand guns or bucket guns. To reduce its viscosity or consistency, it may be dissolved in a volatile solvent such as Stoddard solvent. For a stick-form of lubricant and sealant the quantity of solvent in which the above formulation is dissolved should be up to 20% by weight of the total composition. When a soft bucket gun type of lubricant and sealant is desired, the amount of volatile solvent is increased to about 30 to 40% by weight of the total composition. After the lubricant has been introduced into the valve, operating temperatures drive off the solvent, thereby increasing the viscosity of the lubricant disposed on its valve seat.

Stoddard solvent is well known in the art. It is a petroleum ether, the 50°–60° C. fraction of distilled petroleum. It is readily available on the market and is sold under such trade names as "Shell Sol" and "Standard Thinner 350," by Shell Oil Co., and Standard Oil Company of California, respectively. The Stoddard solvents have an API gravity of 53° at 60° F., specific gravity of 0.766, and a flash point of 103° F. on a closed cup Tagliabue scale.

The following example is illustrative of the practice of my invention.

*Example 1*

| | Parts by wt. |
|---|---|
| Polyisobutylene (ave. mol. wt. 940) | 50 |
| Polyethylene (ave. mol. wt. 21,000) | 33 |
| "Santowax-R" | 17 |
| Stoddard solvent | 25 |

The polyisobutylene, polyethylene and "Santowax-R" were admixed in a conventional kettle provided with a paddle type mixer and heating means. Each of the ingredients were slowly introduced into the kettle with continuous agitation and heated to a temperature range of 400° F. to 450° F. Agitation was continued with heat within the above range until a homogeneous mass was obtained. The mass was allowed to cool to a temperature below 140° F. at which time the Stoddard solvent was worked into the mass. This composition was allowed to cool to room temperature and was then molded into sticks suitable for use in plug type valves. When the lubricant and sealant of Example 1 is used in a plug valve of the type described in the patent to Scherer, supra, the valve is capable of handling extremely hot fluids which raise its metal bearing surfaces to temperatures that char and disintegrate conventional valve lubricants.

The lubricants of this invention are adequate and do not break down at temperatures below 500° F. When the lubricants are used in lubricating valves within the service temperature range of 500° F.–1000° F., they depolymerize very slowly to their initial, gaseous monomers but remain stable over long periods of time, thus requiring additional lubricant to be added only at infrequent intervals, while if excessive temperatures are encountered periodically or continuously the depolymerization is more rapid and more frequent additions of lubricant are necessary. At the lower temperatures in this service range of 500° F. to 1000° F., lubricant additions become necessary only after a week or more of continuous exposure, while in the upper ranges of temperature, lubricant additions are required more frequently, although in any case far less frequently than any other high temperature valve lubricant thus far available to my knowledge. In all cases, however, that portion of the lubricant which is depolymerized simply disperses itself as a gas or vapor leaving the lubricant passageways always free for the reception and conduction of additional lubricant when such additions are required. For example, if the rate of lubricant breakdown is 1% in 24 hours at continued exposure to high temperature, 100 days will elapse before the lubricant reservoir in the valve has to be completely refilled with new lubricant.

Furthermore, the lubricant and sealants of this invention have a satisfactory viscosity over a wide temperature range, the compounded lubricant providing an effective plastic seal, for example, at line pressures of 200 lbs. p.s.i. within the range of 500° F.–1000° F.

Thus, the instant invention, by retaining the lubricant plastic at these high temperature conditions, is particularly advantageous in petroleum refining processes operating in the range of 500° F. to 1000° F. where corrosive fluids are valved in passage and it protects the valve seating surfaces, check valves and other delicate parts from injury.

The lubricant and sealant of my invention is soluble in kerosene and light hydrocarbon oils but is insoluble in water.

The molecular weights recited in the specification and claims are Staudinger molecular weights.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A high temperature plastic lubricant and sealing composition suitable for use in lubricated plug valves consisting essentially of:

(a) a polybutene having an approximate average molecular weight of 200–1,500;

(b) a polymeric alkene compound selected from the group consisting of polyethylene, polypropylene and polybutene, the approximate average molecular weight of said polyethylene, polypropylene, and polybutene being, respectively, 1000–50,000, 200,000–500,000, and 40,000–500,000, said polymeric compound being present in sufficient amount to impart combined lubricating and sealing properties under service conditions in a plug valve and being capable of depolymerizing and evaporating at temperatures of 500–1,000° F. without leaving any carbonaceous or other solid residue; and (c) a compatible, water insoluble plasticizer capable of volatilizing without leaving solid residue at said temperatures in an amount sufficient to impart the viscosity of a soft plastic mass to said composition.

2. The lubricant and sealant composition of claim 1, wherein the relative proportions of said polybutene having a molecular weight of 200–1,500, polymeric alkene compound and plasticizer are such that when the lubricant is subjected to temperatures in the range of 500° F. to 1,000° F., the ingredients evaporate slowly at relative rates such that approximately the same relative proportions of ingredients will remain in the composition thereby resulting in retention by the composition of its lubricating and sealing properties substantially throughout its existence.

3. The lubricant and sealant composition of claim 1, wherein said polymeric alkene compound is polyethylene having an approximate average molecular weight of 21,000.

4. The lubricant and sealant composition of claim 1, wherein said polybutene has an approximate average molecular weight of 940.

5. The lubricant and sealant composition of claim 1, wherein said ingredients are present in substantially the following quantities in parts by weight: polybutene having a molecular weight of 200–1,500, 40–60; compatible polymeric alkene compound, 23–43; plasticizer, 6–27.

6. The lubricant and sealant composition of claim 1, wherein said plasticizer is selected from the ground consisting of diphenyl, triphenyl, diphenylamine and mixed terphenyls.

7. The lubricant and sealant composition of claim 1, further consisting essentially of Stoddard solvent in an amount sufficient to reduce the viscosity thereof to adapt it for use in hand or bucket guns.

8. The lubricant and sealant composition of claim 1, wherein said polymeric alkene compound is a polybutene having an approximate average molecular weight of 7,500–15,000.

9. A high temperature plastic lubricant and sealant composition suitable for use in lubricated plug valves consisting essentially of substantially 40–60 parts by weight of a polybutene having an approximate average molecular weight of between 200–1,500; 23–43 parts by weight of polyethylene having an approximate average molecular weight of 1,000–50,000; and a compatible water insoluble polyphenyl hydrocarbon plasticizer in a quantity sufficient to impart the viscosity of a soft plastic mass to said composition, said plasticizer being such that it will volatilize without leaving solid residue at temperatures of 500° F.–1,000° F.

10. The lubricant and sealant composition of claim 9, wherein said plasticizer is selected from the group consisting of diphenyl, triphenyl, diphenylamines and mixed terphenyls.

11. The lubricant and sealant composition of claim 10, wherein said plasticizer is present in about 6–27 parts by weight.

12. A high temperature plastic lubricant and sealant composition suitable for use in lubricated plug valves consisting essentially of substantially 40–60 parts by weight of a polybutene having an approximate average molecular weight of 200–1,500; substantially 23–43 parts by weight of another polymeric alkene compound selected from the group consisting of polyethylene, polypropylene and polybutene the approximate average molecular weight of said polyethylene and said polypropylene being 1,000–50,000 and 200,000–500,000 respectively, and of said polybutene being 40,000–500,000; and a compatible water insoluble, polyphenyl plasticizer in a quantity sufficient to impart the viscosity of a soft plastic mass to said composition, said plasticizer being such that it will volatilize without leaving solid residue at temperatures of 500° F.–1,000° F.

13. The lubricant and sealant composition of claim 12, wherein said polymeric alkene compound is polyethylene of approximate average molecular weight of 21,000.

14. The lubricant and sealant composition of claim 12, wherein said polybutene has an approximate average molecular weight of 940.

15. The lubricant and sealant composition of claim 12, wherein said plasticizer is selected from the group consisting of diphenyl, triphenyl, diphenylamine and mixed terphenyls.

16. The lubricant and sealant composition of claim 12, wherein said polymeric alkene compound is a polybutene having an approximate average molecular weight of 7,500–15,000.

References Cited in the file of this patent

UNITED STATES PATENTS

| | | |
|---|---|---|
| 2,356,367 | Wright | Aug. 22, 1944 |
| 2,526,986 | Whitney | Oct. 24, 1950 |
| 2,615,857 | Clarke | Oct. 28, 1952 |
| 2,762,775 | Foehr | Sept. 11, 1956 |

FOREIGN PATENTS

| | | |
|---|---|---|
| 710,109 | Great Britain | June 9, 1954 |
| 767,002 | Great Britain | Jan. 30, 1957 |

OTHER REFERENCES

Rubber Age, vol. 59, Apr. 1946, p. 72.

Concise Chemical and Technical Dictionary, Bennett, Chem. Pub. Co. Inc., N.Y., 1947, p. 819.

"Motor Oils and Engine Lubrication," Georgi, Reinhold Pub. Corp., N.Y. 1950, p. 219.

The Condensed Chemical Dictionary, 5th ed. Reinhold Pub. Corp., N.Y., 1957, pp. 190 and 878.

UNITED STATES PATENT OFFICE
CERTIFICATE OF CORRECTION

Patent No. 3,132,104                      May 5, 1964

George F. Scherer

It is hereby certified that error appears in the above numbered patent requiring correction and that the said Letters Patent should read as corrected below.

Column 7, line 27, for "ground" read -- group --; line 54, for "terephenyls" read -- terphenyls --.

Signed and sealed this 29th day of September 1964.

SEAL)
Attest:

ERNEST W. SWIDER                      EDWARD J. BRENNER
Attesting Officer                        Commissioner of Patents